3,462,000
FLUID PRESSURE CONTROL SYSTEM AND CONTROL VALVE THEREFOR
John D. Bachman, Box 683, Bristol, Tenn. 37620
Filed May 16, 1967, Ser. No. 638,963
Int. Cl. B65g 47/34; F15b 13/04
U.S. Cl. 198—28                 9 Claims

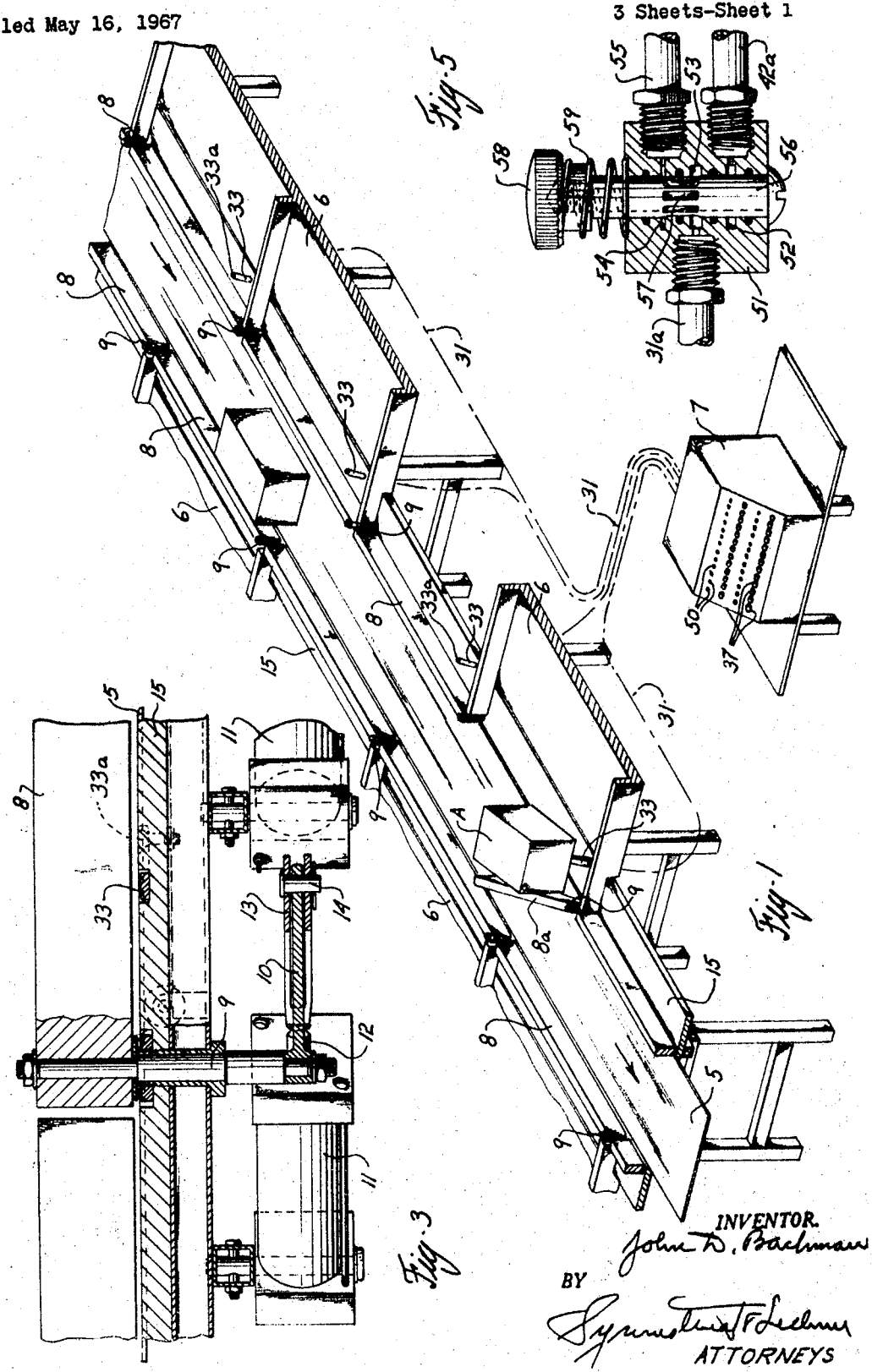

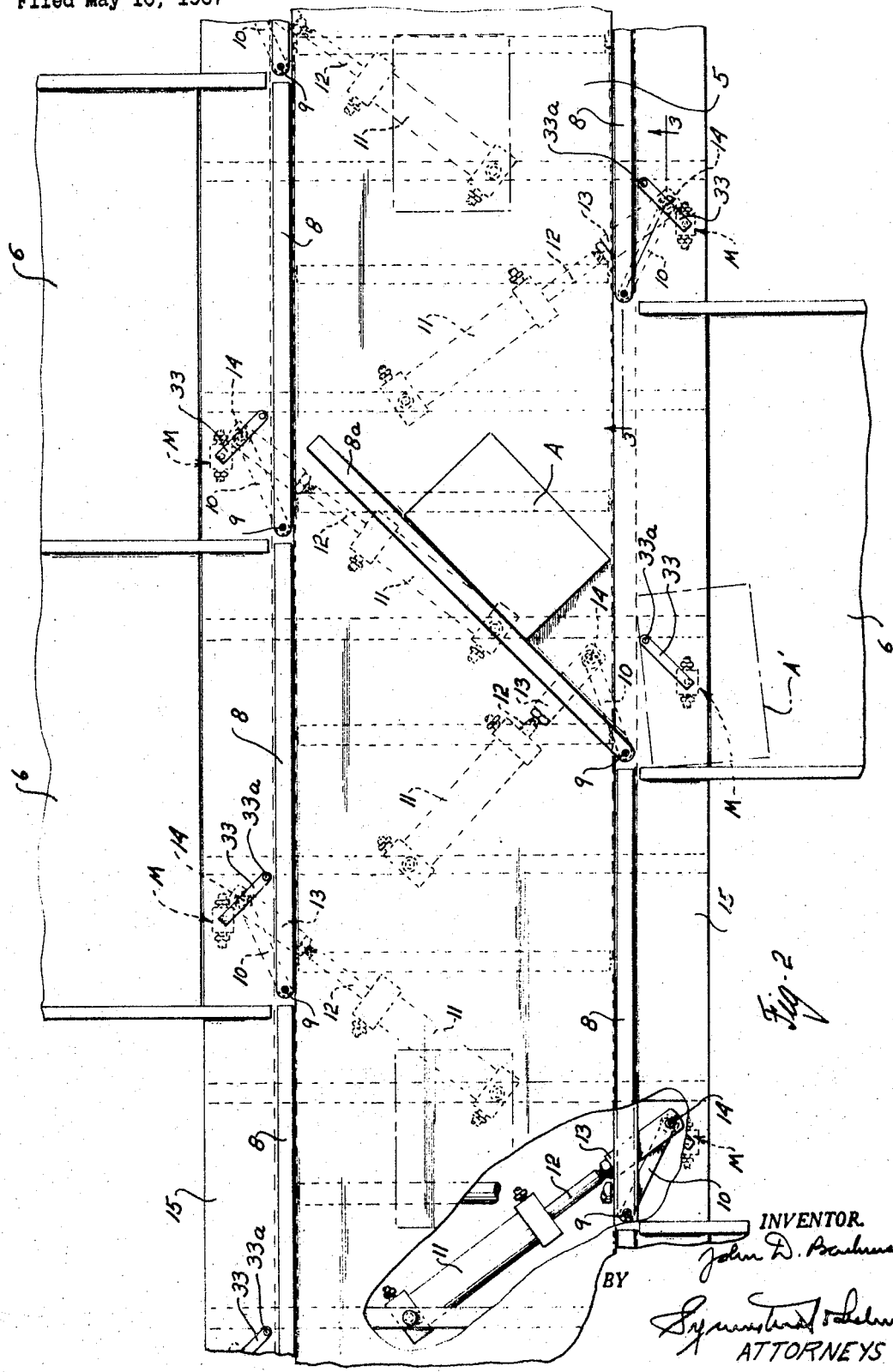

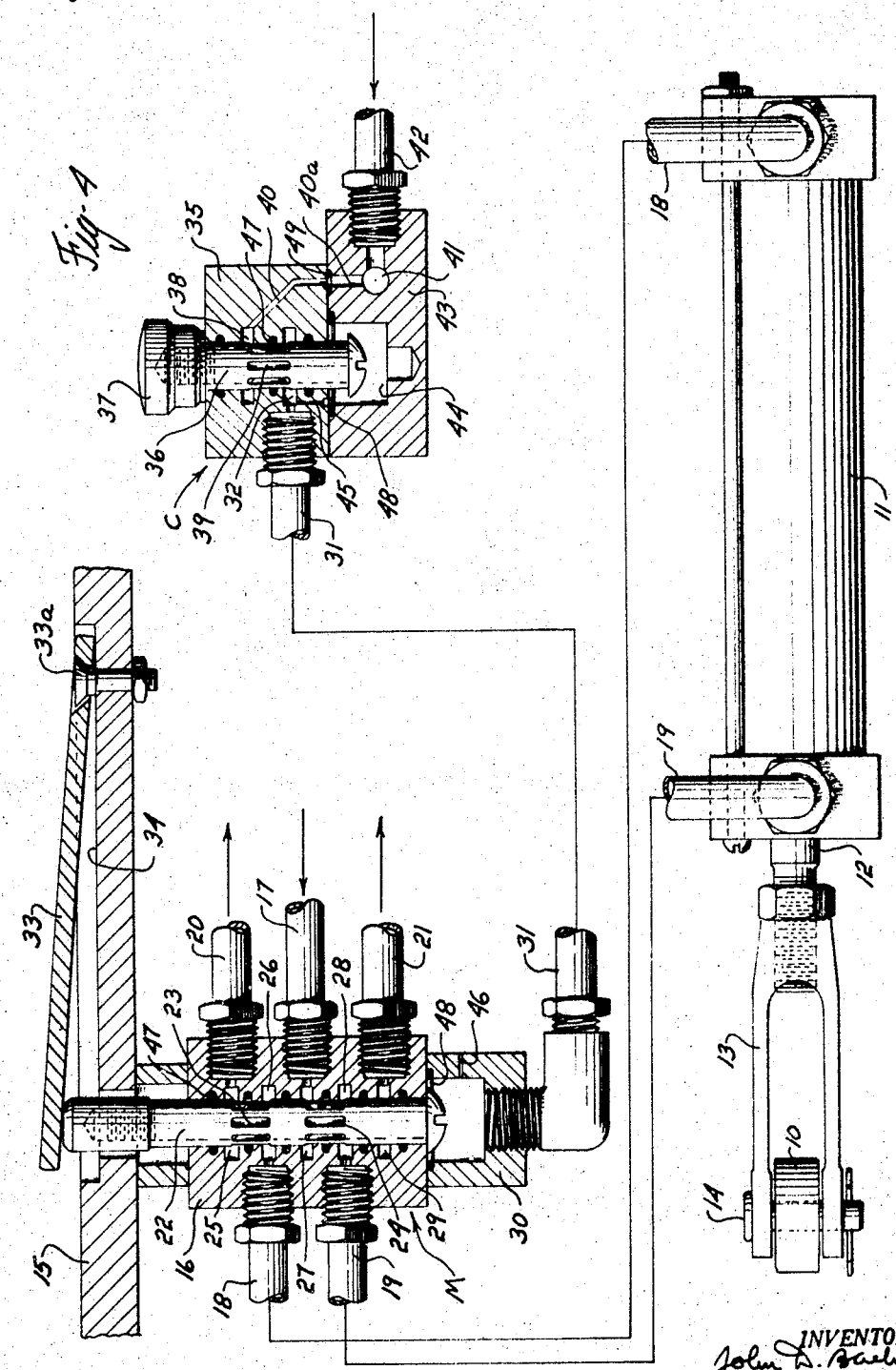

ABSTRACT OF THE DISCLOSURE

Control system having master valve for supply of operating fluid to and exhaust of operating fluid from a fluid pressure device and having a self-cancelling control valve for the master valve with a single control line between the control and master valves.

---

This invention relates to fluid pressure control systems and is particularly concerned with a control system for a fluid pressure operated device in which a control valve is located at a remote station in relation to the device to be controlled.

One of the principal objects of the invention is the provision of a control valve and associated system in which only a single fluid pressure line need be extended from a remote control station to a device to be controlled. This is accomplished according to the invention by a control valve arrangement which is "self-cancelling," so to speak, in view of which release or shutoff of the control valve does not require the attention of the operator or dispatcher, but will be automatically effected by the action of the control system and the control valve incorporated therein.

When the control valves of the present invention are employed in a multiple system, the invention provides for automatic compensation of varying conditions and also for varying distances between the control station and the several devices to be controlled, actuation of the device at the most remote station being equally as positive as at the nearer stations.

A further object of the invention is the simplification of control systems and control valves of the kind referred to, the control valves being provided with internal piloting and manifolding passages which greatly reduce the number of fluid pressure connections which need be made, especially in a control console provided with a multiplicity of control valves.

In connection with still another objective of the invention, it is first noted that the arrangement of the invention is especially adapted for use in pneumatic, usually air pressure, systems. With the system according to the present invention exhaust of air pressure does not occur at the control valve itself, and in view of this, in a control console incorporating a multiplicity of control valves, no air exhaust noises are produced in the console.

Before considering the arrangements illustrated in the drawings, it is still further noted that while the control system and control valves of the present invention are applicable to a wide variety of uses, one typical and particularly effective use lies in the field of controls associated with conveyors and adapted to provide for selective delivery of articles to various work stations located along the path of travel of the conveyor. As this is a particularly effective use of the equipment of the invention, the various features of the invention have been shown as used in association with a conveyor system. The several figures of the drawings are described as follows:

FIGURE 1 is an isometric view of a portion of a conveyor system illustrating a plurality of work stations and devices associated therewith for deflecting articles from the conveyor at the respective work stations, this view further showing a control console associated with the conveyor equipment;

FIGURE 2 is a fragmentary plan view on an enlarged scale illustrating various of the devices associated with the conveyor system;

FIGURE 3 is a vertical sectional view on an enlarged scale taken generally as indicated by the section line 3—3 on FIGURE 2;

FIGURE 4 is a view illustrating an operating cylinder to be controlled by the system of the present invention and further illustrating certain valve devices and the manner of connection of these devices with each other and with the cylinder; and FIGURE 5 is a view similar to FIGURE 4 but illustrating a modified form of control valve which may be employed in certain systems.

In FIGURE 1 a movable conveyor is indicated at 5 and, as here shown, the conveyor is provided with a number of work stations 6 to which articles carried by the conveyor may be delivered selectively by an operator or dispatcher at a control console 7.

Along each side of the conveyor arms or gates 8 are arranged, each gate being mounted on a shaft 9 which is journaled to provide for swinging movement of the gate, for instance from a position extending along the edge of the conveyor to a position such as indicated at 8a in FIGURES 1 and 2. In the latter position, the arm extends over the conveyor at an angle, for instance approximately 45°, providing for deflection of an article from the conveyor to a work station. Such deflection of an article, indicated by a box A in FIGURES 1 and 2, is shown in these figures as it is actually occurring. The completely deflected position of the article A is indicated at A' in FIGURE 2.

In a typical conveyor system of the kind here shown, the pivot mounting shaft 9 is provided with an actuating arm 10 arranged below the level of the conveyor (see particularly FIGURES 2 and 3), and an operating or actuating piston and cylinder device is associated with the arm 10. In the embodiment illustrated this device comprises a double acting pneumatic cylinder 11 having a piston therein (not shown) with which the piston rod 12 is connected, the rod having a clevis 13 pivotally connected at 14 with the arm 10. Appropriate control of the fluid pressure introduced to and exhausted from the opposite ends of the cylinder 11 effects swinging motion of the arms or gates 8 between the deflecting position and the position at the side of the conveyor. Normally the arms at the various work stations are aligned along the edges of the conveyor and serve, in effect, as a sort of rail at each edge of the conveyor belt.

The control system and control valve of the present invention are particularly adapted for use in a conveyor system of the kind just described.

For the purpose of controlling the operation of the gate actuating cylinder 11, a master valve device indicated generally at M (see FIGURES 2 and 4) is associated with each work station, preferably in a position below the deck 15 at the side of the conveyor over which the article being delivered to a given work station is deflected when the deflecting arm is swung over the conveyor, as in the central region of FIGURE 2.

The valve device M is shown in some detail in FIGURE 4 and from this figure it will be seen that the valve has a body 16 having ports therein providing for connection of a fluid pressure supply line 17 and for a pair of fluid pressure lines 18 and 19 extended respectively to the opposite ends of the cylinder 11, as shown in FIGURE 4.

In a typical installation and embodiment according to the invention, the pressure fluid employed is compressed air. In the following description reference is made to air supply or air lines, but it is to be understood that other pneumatic or compressible media may also be employed. Moreover, insofar as certain aspects of the invention are concerned, the features are applicable to any fluid pressure medium, even hydraulic.

The valve body 16 also has exhaust ports which if desired may be provided with exhaust connections 20 and 21. A central bore extends through the valve body 16 to accommodate the generally cylindrical valve member 22 which is shiftable or reciprocable axially in the bore. The valve member is provided with recesses or grooves 23 and 24 located to cooperate with the several ports 25, 26, 27, 28 and 29 with which the several connections 20, 18, 17, 19 and 21 are respectively associated.

When the valve member 22 is in its upper position, as illustrated in FIGURE 4 the supply line 17 is connected with the cylinder line 19, which would thereby provide for shifting movement of the piston 12 toward the right as viewed in FIGURE 4, this being the direction of motion required to swing the arm 8 to a position over the conveyor. At the same time, the cylinder line 18 is connected with the exhaust line 20, so that the right-hand end of the cylinder as viewed in FIGURE 4 will be opened to exhaust.

When the valve member 22 is shifted downwardly, the fluid pressure is supplied to the cylinder line 18 and the cylinder line 19 is opened to exhaust, thereby causing the piston 12 to move in the opposite direction, i.e., in the direction required to swing the arm 8a to a position paralleling the edge of the conveyor 5.

The valve member 22 is arranged to be raised under the influence of fluid pressure supplied by a two-way control valve indicated generally at C. For this purpose the master valve M is provided with an air chamber 30 to which the lower end of the valve 22 is exposed, the chamber 30 being connected by a line 31 with output port 32 of the control valve C. When pressure is admitted to chamber 30 the valve 22 is raised. Motion of the master valve 22 in the downward direction is effected under the influence of a mechanical actuating element 33 preferably mounted in a recess 34 formed in the upper surface of the deck 15 in the region of the valve M, so that the projecting upper end of the valve 22 will abut the lower surface of the finger 33 and may be pushed downwardly by the finger under the influence of an article being deflected from the conveyor at the work station. The finger 33 is fastened to the deck 15 by a bolt 33a cooperating with an oversized hole in the finger so as to permit the other end of the finger freedom for some vertical movement.

From the above it will be seen that when the finger 33 pushes the valve 22 downwardly, the pressure fluid is delivered to the cylinder through the cylinder line 18, thereby causing motion of the arm 8 from the position overlying the conveyor to the position disposed along the edge of the conveyor. On the other hand when the valve 22 is moved upwardly under the influence of air introduced into the chamber 30, the cylinder is operated in a manner to swing the arm 8 from the side position to the deflecting position over the conveyor.

The control valve C includes a valve body 35 having a bore therein adapted to accommodate the generally cylindrical valve member 36, the upper end of which projects from the body and is provided with a manual operating knob 37. The valve body 35 has an inlet or supply port 38 therein adapted to be connected with the outlet port 32 when the valve 36 is in its lower position (as in FIGURE 4) by means of the grooves 39 provided in the valve 36. The inlet port 38 is adapted to be fed through a duct 40 receiving air under pressure from the supply passage 41 which in turn may receive its supply through the supply pipe 42.

In the preferred embodiment of the control valve arrangement, the supply passage 41 extends substantially throughout the length of a manifold 43 in the form of an elongated element with which a series of control valves may be associated in close proximity to each other, for instance a series such as indicated by the control knobs 37 appearing on the console in FIGURE 1. For each of the control valves C, the manifold element 43 will be provided with a passage 40a extended from the manifold passage 41 for cooperation with the duct 40. Moreover, for each of the control valves C, the element 43 is desirably provided with an air chamber 44 to which the lower end of the valve member 36 is exposed for a purpose now to be explained.

As seen in FIGURE 4 a small duct 45 is formed in the valve body 35 in a position to interconnect the outlet port 32 and the chamber 44, and in view of this, when the valve 36 has been manually operated by pressing the knob 37 downwardly, the build-up of air pressure in the control line 31 extended to the chamber 30 of the master valve M causes a build-up of pressure in the chamber 44 which will result in lifting of the control valve 36 to again close off the supply of air from the port 38 to the port 32.

Because of the arrangement just described, it is not necessary for the dispatcher or operator to manually release or lift the valve 36, this being automatically accomplished as a result of the build-up of pressure serving to raise the master valve member 22.

Attention is now directed to the port 46 provided in the wall of the air chamber 30, this port serving as an exhaust or bleed port which will relieve the pressure in the chamber 30 after the control valve 36 has been closed. This bleed off of the pressure from the chamber 30 thus permits the finger 33, under the influence of a deflected article, to lower the master valve 22 and cause the arm 8 at that station to swing from its deflecting position over the conveyor to the position at the side of the conveyor.

In addition to the foregoing, the port 46 further serves to relieve the pressure not only in the chamber 30 and the connected line 31 extended to the outlet port 32 of the control valve, but also in the control chamber 44 below the valve 36. This relief of pressure occurs by reverse flow through the duct 45, and because of this reduction of the pressure in the chamber 44, the control valve itself is again reconditioned and is made ready for its next manual operation by the dispatcher.

In a typical system according to the present invention, the duct 45 may have a cross sectional flow area of from about 0.005″ to 0.013″, and the bleed port 46 preferably has a cross sectional flow area somewhat larger, for instance of the order of 0.025″ to 0.060″, in a typical case, 0.040″ being effective for the purpose.

In a system according to the present invention it is important to adopt certain relationships between the cross sectional flow area of certain passages. Thus, the supply duct 40 should be of substantially larger size than the bleed port 46, and many times as large as the duct 45. In a typical case the supply duct 40 would be of the order of 5 times the cross sectional area of the bleed port 46 and of the order of 40 to 50 times the cross sectional area of the duct 45. With proportions as here specified, it is assured that the supply duct 40 be adequate to build up the pressure in the chamber 30 of the master valve, in spite of the fact that the bleed port 46 is constantly open. The very small size of the duct 45 in relation to the bleed port 46 also assures that the automatic closing of the control valve will not occur until after the master valve has been actuated.

It will be understood that in both the master valve and the control valve the several ports are isolated from each other by suitable packings, for instance by O-rings such as indicated at 47 and that similar sealing rings are also desirably located along the valve members at the outer sides of the various ports.

Note also that a sealing ring 48 is provided between the upper edge of the chamber 30 and the bottom of valve body 16 of the master valve. Such sealing rings are also provided between the body 35 of each of the control valves C and the underlying elongated manifold 43, a ring 48 being employed to seal each of the chambers 44 against the surface of the associated valve body 35. Similarly a small ring 49 is provided between each of the valve bodies 35 and the manifold 43 in the region of the ducts or passages 40–40a.

The construction and arrangement of the control valve has a number of advantages, especially when used in a system as described above in which the master valve is locally vented (through bleed port 46) instead of by return flow to the control valve. First, only a single control air line need be extended from the control valve to the master valve. This is of advantage in any system and particularly in arrangements where the control valve or control valve console is located remotely from the fluid pressure devices being controlled and where devices to be controlled are located at a multiplicity of stations varying in distance from the control point.

The duct 45 in the control valve provides for the utilization of the pressure build-up in the control chamber 30 of the master valve, to effect automatic return of the control valve to its normal position, thus reconditioning the control valve for the next operation by the dispatcher. This is also of especial advantage in a situation where the control valve is located at a station remote from the master valve, because the control valve does not have to await return flow of pressure from the master valve in order to effect resetting of the control valve.

Other advantages which flow from this control valve arrangement and the system described include the fact that no exhaust or exhaust noises exist in the control console. In addition piping or tubing external to the valves themselves is reduced to a minimum.

The control valve arrangement is still further of advantage because it is a compact unit so that a series of the control valves may be arranged and mounted in close proximity to each other, for instance as indicated at the console 7 in FIGURE 1. The compactness of the control valve is further enhanced by virtue of the use of the elongated manifold 43 with which a multiplicity of control valve bodies 35 may readily be associated in a closely coupled series.

When used in a system of the type illustrated in FIGURE 1, the console 7 may also be provided with a series of signal lights 50 which (through mechanism not disclosed herein as it forms no part of the present invention) may be actuated either manually or automatically to give to the dispatcher at the console signals calling attention to work stations at which it is desired to have articles delivered from the conveyor.

Although the control valve C as above described is preferred for most purposes, in certain systems a modified arrangement such as shown in FIGURE 5 may be employed as the control valve.

In FIGURE 5 the valve there shown is a three-way three-port valve having a body 51 with an inlet port 52 with which the air supply line 42a is connected and also having an outlet port 53 with which the pilot line 31a is connected this line being extended to a master valve, for instance a master valve such as shown at M in FIGURE 4. The valve body 51 also has an exhaust port 54 which, if desired, may be provided with an exhaust pipe 55. The valve member 56 in this arrangement is reciprocable between a position in which the grooves 57 interconnect the ports 52 and 53, and a position in which the grooves 57 interconnect the ports 53 and 54. An operating knob 58 is provided, and the valve is released or moved to its normal position by means of the return spring 59. Suitable O-rings between and beyond the ports are provided, as in the valves previously described.

When the valve 56 is manually depressed by operation of the konb 58, fluid pressure is supplied from the supply line 42a to the pilot line 31a thereby delivering operating fluid to the chamber 30 of the master valve and thus causing operation of the master valve in the manner already described. However, when using the control valve of FIGURE 5, it is preferred to omit the bleed port 46, so that fluid pressure in the chamber 30 can only be discharged by reverse flow through the pilot line 31a and this will occur when the valve 56 is released, i.e., moved upwardly under the influence of spring 59. In this released position the pressure in line 31a and thus in the operating chamber 30 of the master valve is discharged through the exhaust port 54. It will be noted that the exhaust port 54 is of small size as compared with the inlet and outlet ports 52 and 53 and as compared with the line or conduit 31a, and in view of this, the exhaust of the control chamber 30 of the master valve is retarded, thereby ensuring that the master valve will be properly actuated before the pressure is bled off, even if the operator very quickly releases the control knob 58.

The control valve of FIGURE 5 may be manifolded in the general manner described above with reference to control valve C, in order to provide air supply to a multiplicity of the valves from a common air supply passage, but in such manifolding, it will not be necessary to provide the pressure chambers or ducts such as indicated in FIGURE 4 at 44 and 45 for control valve C.

The arrangement of FIGURE 5, like the arrangement in the first embodiment described has the advantage that it requires only a single line between the control station and the device being controlled. Moreover, both of the arrangements provide for automatic cancelling of the control signal to the master valve, so that the operator or dispatcher is not required to manipulate a control for the purpose of "release." However, the arrangement in accordance with FIGURES 1–4 inclusive has certain added advantages, including the fact that greater assurance is provided that the control valve will not be released until after the effective operating pressure has been built up to actuate the master valve. Moreover, the arrangement of FIGURES 1–4 has the added advantage that no exhaust occurs at the dispatcher's station or console.

The valve bodies of the master and control valves, including the control valve manifold may be formed of any suitable materials, including metals, but certain reinforced plastic materials are highly effective for this purpose, such as fabric reinforced phenolic laminates.

I claim:

1. In a fluid pressure system for controlling the operation of a device adapted to be actuated by pressure fluid, a master valve including a valve member shiftable to a position to deliver actuating pressure fluid to said device, means for shifting the master valve member to said position including a fluid pressure chamber, a control valve having an output port connected with said chamber and including a control valve member manually movable to one position to build up valve operating pressure in said port and the connected fluid pressure chamber for shifting the master valve member, and mechanism for moving the conrtol valve member to a second position to terminate the build-up of operating pressure in the pressure chamber, said mechanism including fluid pressure means responsive to build-up of said operating pressure to move the control valve member to said second position.

2. Apparatus according to claim 1 in which the fluid pressure mechanism for moving the control valve member comprises a fluid pressure chamber to which the control valve member is exposed, and a pressure bleed port inter-connecting said last chamber and the output port of the control valve.

3. Apparatus for controlling the operation of a conveyor feed system having a piston operated movable arm for deflecting an article from the conveyor at a conveyor discharge station, a master valve for controlling delivery of actuating fluid to the arm operating piston and including a valve member shiftable in a first direction to supply actuating fluid to the piston and in a second or opposite direction to terminate such supply, means for shifting the master valve member in the first direction including a fluid pressure chamber, means operated by discharge of an article at said discharge station for shifting the master valve member in the second direction, a control valve having an output port connected with said chamber and including a control valve member manually movable in a first direction to build up valve operating pressure in said port and the connected fluid pressure chamber to supply actuating fluid to the piston and thereby move the arm to its position to deflect an articale from the conveyor, the control valve member being movable in a second or opposite direction to terminate pressure build-up in the output port and the connected chamber and thus terminate supply of actuating fluid to the piston, and fluid pressure mechanism responsive to build-up of valve operating pressure in said port and connected chamber comprises a fluid pressure chamber to which the con-position to terminate build-up of such pressure.

4. Apparatus according to claim 3 in which the fluid pressure chamber for shifting the master valve member in the first direction is provided with a bleed port providing for bleed-off of pressure when supply of operating pressure by the control valve is terminated.

5. Apparatus according to claim 3 in which the fluid pressure mechanism for moving the control valve member comprises a flued pressure chamber to which the control valve member is exposed, and a pressure bleed port interconnecting said last chamber and the output port of the control valve.

6. Apparatus according to claim 5 in which the fluid pressure chamber for shifting the master falve member in the first direction is provided with a bleed port providing for bleed-off of pressure from the fluid pressure chamber for shifting the master valve, from the output port of the control valve and thus from the fluid pressure chamber for moving the control valve member through the pressure bleed-off port interconnecting said last chamber and the output port.

7. A fluid pressure control valve device comprising a valve body having a bore therein for receiving a valve member, a valve member received in said bore and arranged for shifting movement axially of the bore, the valve body having an input port and an output port adapted to be interconnected by movement of the valve member in one axial direction and to be disconnected by movement of the valve member in the opposite axial direction, one end of the valve member being externally exposed for manual actuation thereof in said one axial direction, and mechanism responsive to build-up of pressure in the output port for moving the valve member in said opposite direction comprising a pressure chamber to which the other end of the valve member is exposed, and a bleed part interconnecting the output port and said chamber.

8. A fluid pressure control valve mechanism comprising an elongated manifold having a fluid pressure supply passage extending lengthwise therein, a plurality of control valve bodies arranged in a series along the manifold, each body having a bore therein for receiving a valve member, a valve member received in said bore and arranged for shifting movement axially of the bore, each valve body having an input port and an output port adapted to be interconnected by movement of the valve member in one axial direction and to be disconnected by movement of the valve member in the opposite axial direction, one end of the valve member being externally exposed for manual actuation thereof in said one axial direction, the manifold having individual supply ducts for the respective control valves, each connected with the pressure supply passage, and each valve body having a supply duct communicating with one of the supply ducts in the manifold, and, for each control valve, mechanism responsive to build-up of pressure in its output port for moving the valve member in said opposite direction comprising a pressure chamber formed in the manifold and to which the other end of the valve member is exposed, and a bleed port interconnecting the output port and said chamber.

9. In a fluid pressure system for contdolling the operation of a device adapted to be actuated by pressure fluid, a master valve including a valve member shiftable to a position to deliver actuating pressure fluid to said device, means for shifting the master valve member to said position including a fluid pressude chamber, a control valve having an output port with conduit means connected with said chamber and including a control valve member manually movable to one position to build up valve operating pressure in said port and the connected fluid pressure chamber for shifting the master valve member, mechanism for moving the control valve member to a second position to terminate the build-up of operating pressure in the pressure chamber, and mechanism for releasing the pressure in said chamber and the connected conduit means including a pressure bleed port of small cross-sectional area as compared with said conduit means.

References Cited

UNITED STATES PATENTS

| | | | |
|---|---|---|---|
| 2,891,518 | 6/1959 | Krapf | 137—596.18 |
| 2,986,264 | 5/1961 | Holben | 198—188 X |
| 3,276,563 | 10/1966 | Fitzgerald et al. | 198—28 |

EDWARD A. SROKA, Primary Examiner

U.S. Cl. X.R.

137—625.63